(No Model.)

J. W. MOAKLER.
ELECTRIC ROAD VEHICLE.

No. 500,022. Patented June 20, 1893.

WITNESSES:
Fred G. Dieterich
Edw. W. Byrn

INVENTOR:
John W. Moakler
BY Munn & Co.
ATTORNEYS

UNITED STATES PATENT OFFICE.

JOHN W. MOAKLER, OF DENVER, COLORADO, ASSIGNOR OF ONE-HALF TO HORACE E. HENWOOD, OF KANSAS CITY, MISSOURI.

ELECTRIC ROAD-VEHICLE.

SPECIFICATION forming part of Letters Patent No. 500,022, dated June 20, 1893.

Application filed April 16, 1892. Serial No. 429,506. (No model.)

*To all whom it may concern:*

Be it known that I, JOHN WILLIAM MOAKLER, residing at Denver, in the county of Arapahoe and State of Colorado, have invented a new and useful Improvement in Electric Road-Vehicles, of which the following is a specification.

The object of my invention is to provide an improved road vehicle, or a locomotive for drawing cars, or other propelled vehicle, the said vehicle being adapted to be propelled by electrical energy supplied by storage batteries or other generator of electricity.

It consists mainly in the application of a worm screw fastened directly on shaft of the armature or motor, in combination with other features which I will now proceed to fully describe with reference to the drawings, in which—

Figure 1:
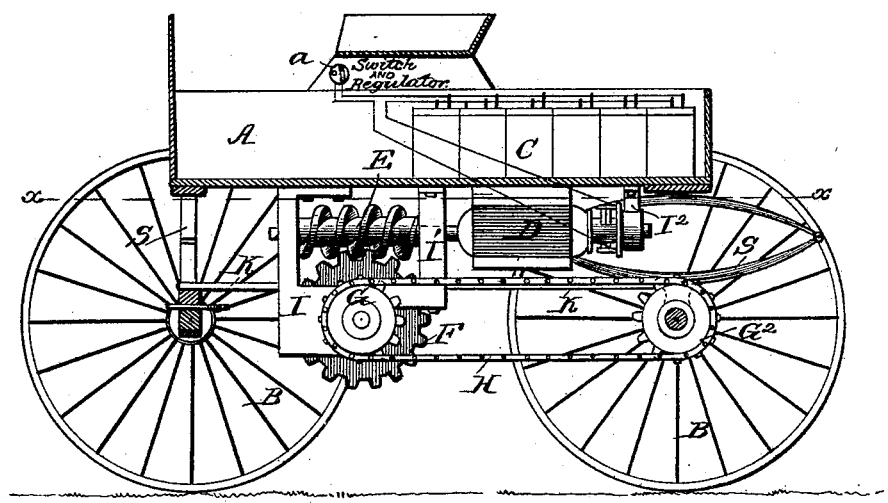
Figure 2:
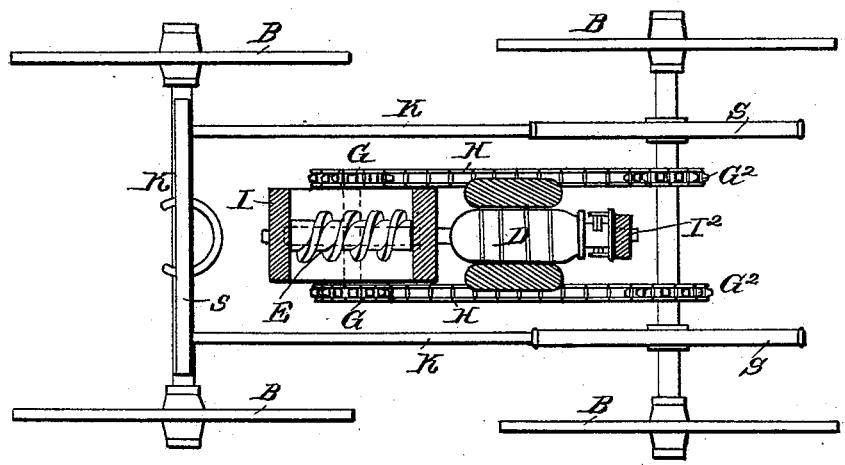

Figure 1 is a vertical longitudinal section, and Fig. 2 is a horizontal section on line $x$—$x$.

A represents the vehicle body which may be of any form and construction, and B are its running wheels. These wheels are provided with any suitable running gear K, and the body is supported thereon by means of any suitable springs S. To the under side of the body and below its floor is firmly attached an electric motor sustained in pendent supports, I', I$^2$, forming its frame.

Upon the armature shaft in line therewith there is fastened directly a worm E journaled in a frame I I' also connected to the bottom of the vehicle body below the floor. This worm extends in front from the motor, and engages with the upper part of the worm wheel F fixed on a horizontal transverse shaft journaled in the frame I I'. This shaft has rigidly attached to it on each side of the worm wheel a sprocket wheel G, each of which is connected by a chain belt H, with a rigid sprocket wheel G$^2$ on the rear axle which latter is rigidly attached to the running wheels B, so that the motion of the motor may be imparted thereto to propel the vehicle. Now, as the body A, of the vehicle moves up and down by reason of its springs, the motor, worm, frame I I' and its gear wheels F G move with it, the flexible belt H permitting this freedom of motion.

An important feature of my invention is the connecting of the worm directly to the armature shaft which saves power and simplifies the construction.

At a suitable point within the vehicle is arranged a series of storage batteries C, which are connected to a regulator and switch $a$ below the vehicle seat by means of which the current may be properly directed to the motor to run it forward or backward and regulate its movement.

Around the gears and working parts of the device a suitable case is arranged to exclude dust and dirt.

Having thus described my invention, what I claim, and desire to secure by Letters Patent, is—

1. The combination with the vehicle body, the rear axle having two sprocket wheels G$^2$ G$^2$, and springs interposed between the axle and body; of an electric motor D fixed to the bottom of the vehicle body; the worm wheel F with sprocket wheels G G arranged upon opposite sides thereof; a supporting frame I I' connected to the bottom of the vehicle body; the screw or worm E fixed directly upon the armature shaft, journaled in the frame I I', and meshing with the wheel F; and the two chain belts H H connecting the two sprocket wheels G with the two sprocket wheels G$^2$ substantially as and for the purpose described.

2. The combination of the vehicle body having battery C, and regulator with switch $a$, the electric motor D, the worm E fixed to the motor armature, the frame I I' I$^2$ connected to the bottom of the vehicle body and sustaining the motor and worm, the worm wheel F, and the sprocket gears and belt G G$^2$ H, substantially as shown and described.

JOHN W. MOAKLER.

Witnesses:
J. W. DUPREE,
R. J. WALKER.